(12) United States Patent
Hagemann et al.

(10) Patent No.: US 11,860,521 B2
(45) Date of Patent: Jan. 2, 2024

(54) LIGHT SOURCE WITH PHOTOLUMINESCENCE EMITTER

(71) Applicant: SCHOTT AG, Mainz (DE)

(72) Inventors: Volker Hagemann, Nieder-Olm (DE); Albrecht Seidl, Niedernberg (DE)

(73) Assignee: SCHOTT AG, Mainz (DE)

( * ) Notice: Subject to any disclaimer, the term of this patent is extended or adjusted under 35 U.S.C. 154(b) by 566 days.

(21) Appl. No.: 16/919,246

(22) Filed: Jul. 2, 2020

(65) Prior Publication Data

US 2021/0003909 A1   Jan. 7, 2021

(30) Foreign Application Priority Data

Jul. 4, 2019 (DE) ...................... 10 2019 118 060.0

(51) Int. Cl.
G03B 21/20 (2006.01)
C09K 11/77 (2006.01)
G03B 33/12 (2006.01)
G03B 21/06 (2006.01)
G03B 21/16 (2006.01)

(52) U.S. Cl.
CPC ........ *G03B 21/204* (2013.01); *C09K 11/7794* (2013.01); *G03B 21/16* (2013.01); *G03B 33/12* (2013.01)

(58) Field of Classification Search
CPC ... G03B 21/204; G03B 33/12; C09K 11/7794
USPC ........................................................ 353/31
See application file for complete search history.

(56) References Cited

U.S. PATENT DOCUMENTS

| 2011/0116253 | A1* | 5/2011 | Sugiyama | G03B 11/00 |
| | | | | 362/84 |
| 2011/0149549 | A1* | 6/2011 | Miyake | G03B 21/204 |
| | | | | 362/84 |
| 2011/0279017 | A1 | 11/2011 | Li | |
| 2013/0242273 | A1 | 9/2013 | Weichmann | |
| 2014/0293576 | A1 | 10/2014 | Chou | |
| 2014/0375959 | A1* | 12/2014 | Yang | G03B 21/204 |
| | | | | 353/31 |

(Continued)

FOREIGN PATENT DOCUMENTS

| CN | 204201727 U | * 3/2015 |
| DE | 102017209807 | 12/2018 |

(Continued)

OTHER PUBLICATIONS

Translation of CN 204201727 (Year: 2023).*

(Continued)

*Primary Examiner* — Jerry L Brooks
(74) *Attorney, Agent, or Firm* — Ruggiero McAllister & McMahon LLC

(57) ABSTRACT

A light source is provided that includes a laser operable to emit laser light at a wavelength in a range from 460 nanometers to 470 nanometers and a converter assembly arranged so as to absorb the laser light emitted by the laser and to emit photoluminescent light produced by the laser light and having a longer wavelength than the laser light. The converter assembly has a converter element with a ceramic doped with $Eu^{3+}$ such that under irradiation of the laser light the converter assembly emits photoluminescent light in the red spectral range.

19 Claims, 9 Drawing Sheets

(56) References Cited

U.S. PATENT DOCUMENTS

| | | | |
|---|---|---|---|
| 2017/0293211 A1* | 10/2017 | Kobayashi | G03B 21/16 |
| 2017/0307968 A1* | 10/2017 | Nagasaki | F21V 9/32 |
| 2019/0171093 A1 | 6/2019 | Furuyama | |
| 2020/0280173 A1* | 9/2020 | Gao | H01S 5/142 |

FOREIGN PATENT DOCUMENTS

| | | |
|---|---|---|
| JP | 2001156388 | 6/2001 |
| JP | 2014203819 | 10/2014 |
| JP | 2018169413 | 11/2018 |
| WO | 2012012354 | 1/2012 |
| WO | 2018074132 | 4/2018 |

OTHER PUBLICATIONS

Neeraj, "Novel red phosphors for solid-state lighting: the system $NaM(WO_4)_{2-x}(MoO_4)_x:Eu^{3+}$ (M=Gd, Y, Bi)", Chemical Physics Letters, 387 (2004) 2-6.

* cited by examiner

LIGHT SOURCE WITH PHOTOLUMINESCENCE EMITTER

CROSS REFERENCE TO RELATED APPLICATIONS

This application claims benefit under 35 USC § 119 of German Application No. 10 2019 118 060.0, filed Jul. 4, 2019, the entire contents of which are incorporated herein by reference.

BACKGROUND

1. Field of the Invention

The invention generally relates to light sources that generate light through photoluminescence.

2. Description of Related Art

Modern LED-based light sources (i.a. white light sources) are based on blue emitting light-emitting diodes, the light of which is partly converted into yellow light using photoluminescence converters. Photoluminescence converters are also known as phosphors, light converters, fluorescence converters, or simply converters. The combination of the yellow light with the rest of the blue light creates a white light impression. The most prominent light converter is cerium-doped YAG (Ce:YAG; YAG=yttrium aluminum garnet) which, however, due to its emission spectrum with a small red fraction, only provides for a poor color rendering index. This drawback could be overcome by a red emitting converter. However, there is no red converter known which provides all the good properties of the cerium-doped YAG in terms of efficiency, performance stability, thermal stability, blue absorption, and price.

One class of red converters that exhibit good quantum efficiency and acceptable stability includes molybdates, vanadates, tungstates, and tantalates doped with $Eu^{3+}$. These compounds additionally contain at least one of the following elements: lanthanum, terbium, gadolinium, yttrium, and lutetium, and the doping with $Eu^{3+}$ consists in the fact that a certain percentage of these elements are replaced by Eu, which percentage may be up to 100%.

The principle properties of this material class will be discussed below byway of $(Y_{0.5}Eu_{0.5})_2Mo_3O_{12}:Eu^{3+}$ as an example. What is of particular interest for lighting applications are the $Eu^{3+}$ transitions $^7F_0 \rightarrow ^5D_2$ (excitation at 465 nm) and $^5D_0 \rightarrow ^7F_2$ (emission between 610 nm and 630 nm), since this excitation occurs at wavelengths of available light-emitting diodes and laser diodes and since the sensitivity of the eye is still good for the emission in the red: The brightness sensitivity profile $V(\lambda)$ of a CIE 2° observer has a value of 260 lm/W at 620 nm. This is 38% of the maximum sensitivity of 683 lm/W that the human eye has for green light at a wavelength of 555 nm. At 640 nm already, the sensitivity is as low as 120 lm/W or 17.5% of the green sensitivity.

However, when this phosphor is used for white light LEDs, the problem arising is that only a small fraction of the light emitted by the blue LED is absorbed, so that such a light-emitting diode assembly has a very poor efficiency. Efficiency measures include, for example, wall plug efficiency, optical efficiency, or luminous efficacy.

Wall plug efficiency puts the useful light output (i.e. that of red light, here) in relation to the electrical power consumed for the blue LED.

Optical efficiency puts the useful light output (i.e. that of red light, here) in relation to the optical output of the LED that is used. Luminous efficacy is the ratio of photometric luminous flux measured in lumen (lm) to the optical power of the light emitting diode used.

The reason for the poor blue absorption is the narrow line width of absorption, which only uses a small portion of the approx. 25 nm wide blue spectrum of the light emitting diode.

SUMMARY

Therefore, the object of the invention is to provide a light source exhibiting high luminance and high efficiency, which emits red light or light that contains red spectral components. The red spectral components allow, inter alia, to achieve a color rendering index that is improved compared to Ce:YAG-based white light sources.

The idea on which the invention is based is a light source in which an $Eu^{3+}$-doped inorganic (e.g. ceramic) phosphor is excited using a laser.

Accordingly, the invention provides a light source which comprises a laser that is operable to emit laser light at a wavelength in the range from 460 nanometers to 470 nanometers. Particularly preferably, the wavelength is in the range of 465 nm±2 nm. The light source furthermore comprises a converter assembly which is adapted so as to absorb the laser light emitted by the laser and to emit photoluminescent light produced by the laser light and having a longer wavelength than the laser light, the converter assembly comprising an inorganic converter element that is doped with $Eu^{3+}$ such that under irradiation of the laser light the converter emits photoluminescent light in the red spectral range. Thus, the converter element may also be referred to as a luminescent inorganic element.

The configuration of the converter assembly determines, for example, whether this is a remissive arrangement in which the excitation light is incident on the same side from which the useful light is emitted, or whether this is a transmissive arrangement in which the excitation side and the useful light side are different sides of the inorganic converter element.

By exciting the $Eu^{3+}$-doped phosphor not with a rather broadband LED with a line width of 20-30 nm FWHM, but rather with a narrowband laser, several drawbacks of the prior art are addressed. Since a laser provides for excitation with high irradiance, significantly higher luminance levels can be achieved than with LED excitation. Since the narrow spectral distribution of the laser is well adapted to the narrow excitation band of the $Eu^{3+}$-doped phosphor in the form of an inorganic luminescent converter element, good absorption of the excitation light is ensured. The high irradiance magnitudes required for high luminance levels imply an increased temperature of the converter, caused by thermal losses (e.g. due to Stokes shift or to non-ideal quantum efficiency), and a heat flow with high heat flow density that has to be dissipated from the converter material. An inorganic converter as suggested by the invention is significantly better suitable for this purpose than a converter assembly in which the phosphor is, for example, embedded in the form of a powder in a polymer, in which case the latter then determines the (poor) thermal conductivity of the arrangement. Inorganic converters also exhibit a higher threshold for damage caused by the elevated temperatures than converters with organic constituents. Inorganic converters are preferably ceramic converters, but may also be made of glass ceramics, glass, sintered glass powder, glass with embedded converter particles or with embedded phosphor powder, or converter particles fixed with inorganic material (e.g. an oxidic coating).

Suitable $Eu^{3+}$-doped ceramic materials include, e.g., $(Y_{1-x}Eu_x)_2$ $Mo_3$, $O_{12}$, $(Y_{1-x}Eu_x)_2$ $Mo_4O_{15}$, $Li_3Ba_2(La_{1-x}Eu_x)_3(MoO_4)_8$, $K(Y_{1-x}Eu_x)(WO_4)_2$, $Li(Y_{1-x}Eu_x)(WO_4)_2$, $Na(Y_{1-x}Eu_x)(WO_4)_2$, $MgY_{2-x}Eu_x(WO_4)_4$, $CaY_{2-x}Eu_x(WO_4)_4$, $Ca_{1-2x}Eu_xLi_xWO_4$. These materials can be easily prepared as luminescent ceramic elements. Ceramic materials in which the host lattice of the $Eu^{3+}$ ions is a scheelite lattice are particularly suitable. Host lattices with a tetragonal crystal structure are particularly suitable.

Since the lifetime of photoluminescence is typically in the order of 1 ms for $Eu^{3+}$-doped converters, these converters are particularly suitable for static applications. However, their use in converter wheels shall not be excluded here.

In the case of converter wheels, a photoluminescent material is applied to a rotating carrier disk which promotes the cooling of the converter assembly. The excitation light excites the converter of common design via high-aperture optics which are also used to collect the photoluminescent light. However, if the lifetime of photoluminescence is significantly longer than the time within which the excited converter area moves out of the range of the irradiation and collection optics, part of the luminescence light will not be collected. Optionally, this effect can be counteracted by suitably adapted optics or by lower tangential velocities.

In static applications, the converter does not move. In order to nevertheless ensure good dissipation of the heat that arises in the light conversion process, the converter element is favorably well coupled to a heat spreader or heat sink. The heat spreader may, for example, be made of a material exhibiting good thermal conductivity, e.g. of metals such as copper or aluminum, or may else be made of ceramics such as aluminum oxide.

The surface of the converter material is divided into a useful-light area and a non-useful-light area.

The light emitted from the useful-light area is forwarded to be exploited, for example in digital projectors or spotlights. In order to also exploit light that impinges on the non-useful-light area of the surface, the latter area may be at least partially mirrored or surrounded by a diffusely or specularly reflecting reflector.

For this purpose, the interface to the heat spreader is favorably designed to be diffusely or specularly reflective. Which areas of the surface of the converter element define useful-light areas and non-useful-light areas also depends on the type of the converter assembly. If a converter assembly is designed for operation in remission, the laser light exciting luminescence is irradiated onto the useful-light area. For operation in transmission, the useful-light area and the laser light irradiation area are different surface areas.

The invention will be explained in more detail below with reference to the attached figures.

DETAILED DESCRIPTION

Figure 1:
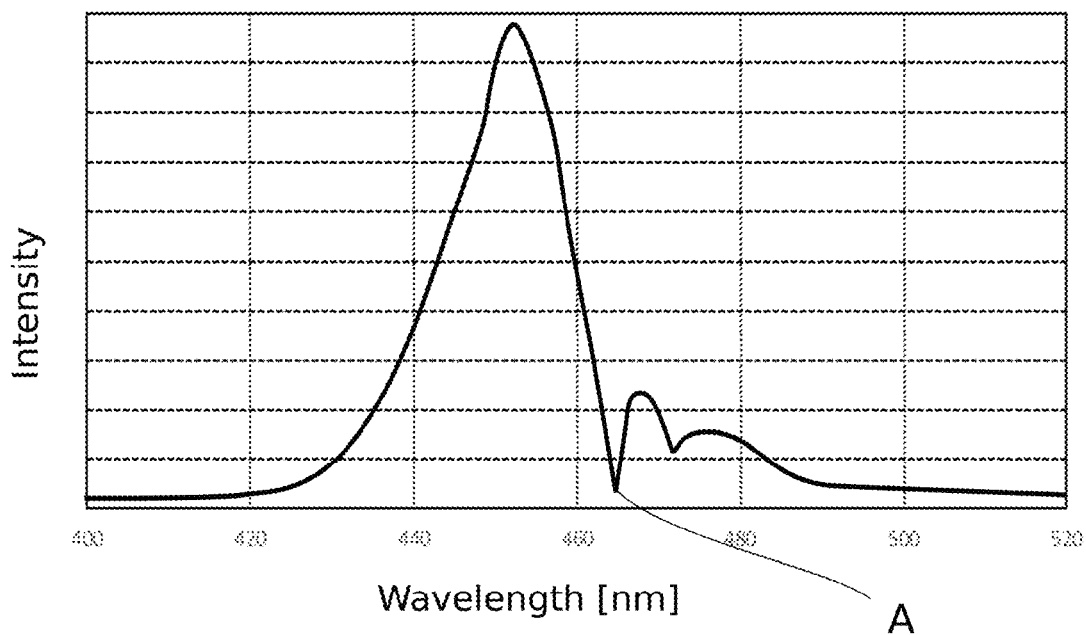
FIG. 1 schematically shows the intensity profile of diffuse reflection of a converter irradiated by a blue light-emitting diode.

FIG. 1 schematically shows the spectrum of diffuse reflection of an $Eu^{3+}$-doped ceramic converter that is excited by a blue light-emitting diode. The illustrated part of the spectrum is in the blue spectral range and essentially includes the blue excitation light of the light-emitting diode, which is scattered back at the converter. The spectrum of the light-emitting diode is represented as a broad peak in the spectrum. The narrow dip at about 465 nm, marked "A", which can be seen in the spectrum of FIG. 1 and which almost reaches the ground level, reveals that for the absorption line at 465 nm absorption is 90% or more of the irradiated power. Thus, in principle, absorption of blue light is not bad in an $Eu^{3+}$-doped material. Rather, the graph shows that the narrow absorption band of the $Eu^{3+}$ ions, when compared to the rather broad spectrum of the LED, implies only low total absorption of the LED light and hence poorly effective photoluminescence excitation and thus results in low optical efficiency.

The invention avoids this drawback by matching the intrinsically narrow-band laser with the narrow absorption spectrum of the $Eu^{3+}$ ions. The surrounding medium has hardly any impact on the spectral position of absorption of the $Eu^{3+}$ ions. Typically, absorption occurs at approximately 465 nm, as can also be seen from FIG. 1. Therefore, according to a further embodiment of the invention, a laser is used which emits laser light with a wavelength in the wavelength range between 460 nm and 470 nm. Preferably, the laser wavelength is 465 nm, or 465 nm±2 nm.

Another drawback of a blue LED as an excitation light source is its radiance or radiant flux which is orders of magnitude lower than that of a laser. Accordingly, a drawback of LED-based phosphor-converting light sources is their low luminance which is lower than the luminance that can be achieved with laser-excited ceramic converters by approximately a factor of 10. Accordingly, a phosphor converter light source with high luminance is provided. In this way, high luminous flux can be achieved with the same emitter area as with a phosphor converter LED.

For a highest possible and most consistent possible luminous efficiency, luminance, and luminous flux, it is advantageous to stabilize the wavelength of the laser and to adjust it to the absorption frequency of the $Eu^{3+}$ ions.

In fact, it is not at all trivial from a technical standpoint to tune the blue laser the most precisely possible to the absorption wavelength of 465 nm of the $Eu^{3+}$ transition $^7F_0 \rightarrow {}^5D_2$. The emission wavelength of diode lasers which are typically used in applications varies due to the manufacturing process and may also vary as a function of electrical current density and temperature.

Nevertheless, diode lasers with an emission wavelength of 465 nm are commercially available and may be used for the excitation of $Eu^{3+}$-doped red emitting photoluminescence converters without further wavelength stabilization. This is in particular true since in practice the diodes are often operated with previously known currents and within a limited temperature range. Optionally, diode lasers with the desired laser wavelength are selected from a production batch in order to meet the absorption wavelength of the $Eu^{3+}$ transition $^7F_0 \rightarrow {}^5D_2$.

Alternatively, according to a further embodiment of the invention, means for stabilizing the laser wavelength are provided.

Figure 2:
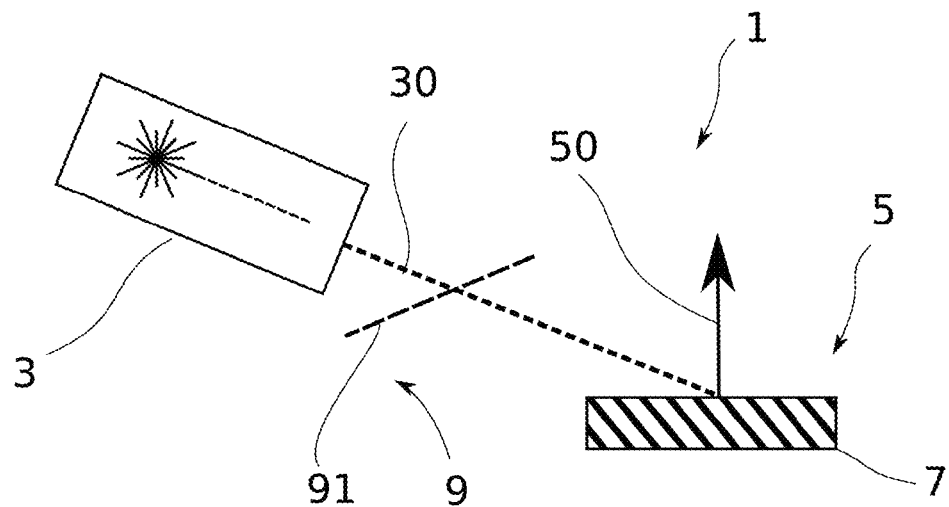
FIG. 2 schematically shows the configuration of a light source comprising a converter and with stabilization of the laser wavelength.

In order to avoid the laser from shifting or changing its lasing wavelength during operation, it is possible according to one embodiment to use a laser that is stabilized by an external grating. FIG. 2 schematically shows an embodiment of the invention comprising a stabilizer 9, with a diffraction grating 91 being used as the stabilizer 9 or as a component thereof. The laser beam 30 emitted by the laser 3 is directed onto the luminescent inorganic converter element 7 of converter assembly 5. Converter assembly 5 emits light 50 which in addition to red photoluminescent light also includes components of the primary light, i.e. the blue laser light, depending on the configuration. The admixed laser light is produced in particular through scattering of the light of the primary laser beam 30. An diffraction grating 91 is arranged in the beam path of the laser beam 30 and is arranged such that laser light of a higher diffraction order is fed back into the laser cavity. For this purpose, the grating 91 is arranged obliquely relative to the laser beam 30 in the example shown. By orienting the grating, i.e. in its angle, relative to the laser beam 30, the feedback wavelength can be selected and laser emission can be stabilized to this wavelength. According to one embodiment, the grating 91 is positioned such that light with a wavelength in the range of 465 nm±2 nm is irradiated.

According to a further embodiment, active loop control of the laser wavelength is suggested, which stabilizes the laser to the absorption wavelength of the $Eu^{3+}$ using a loop control circuit of the light source. Loop control may be accomplished by adjusting a parameter which has an impact on the wavelength of the light. One such parameter is the temperature of the laser. By adjusting the laser's temperature, for example, optimization for maximum absorption is achieved.

Figure 3:
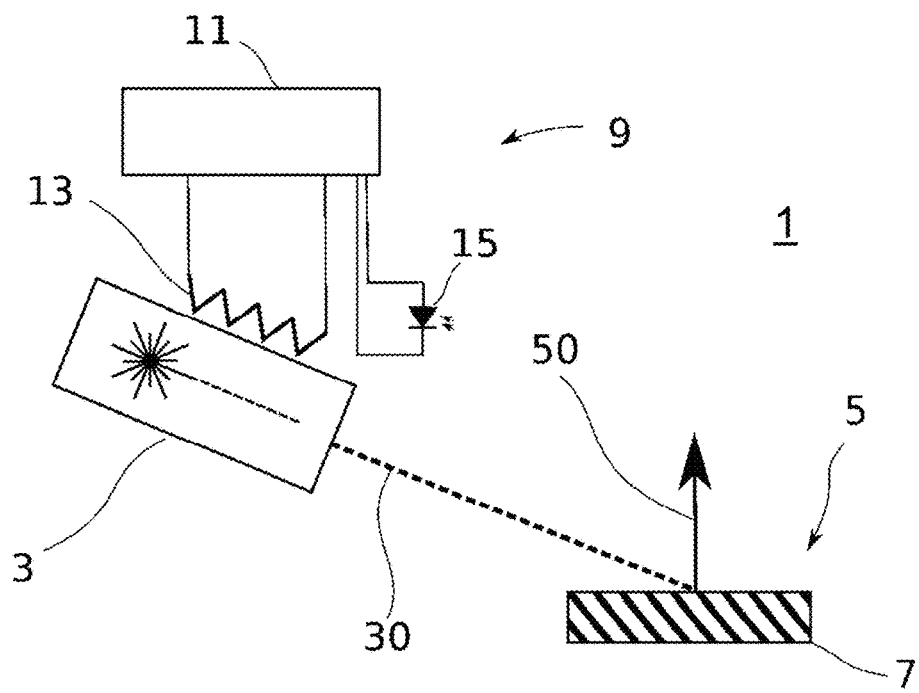
FIG. 3 shows a further embodiment of a light source with wavelength stabilization.

FIG. 3 schematically shows an exemplary configuration for this purpose. The means 9 for stabilizing the wavelength comprise a loop control circuit 11 and connected thereto a heating element 13 and at least one light detector 15. Light detector 15 may comprise a photodiode or a phototransistor, for example, as illustrated. A simple way of controlling the loop control circuit is to measure the red light emitted by the converter 5 or the blue light scattered back by the converter 5. The loop control circuit then drives the laser 3 such that the emission of red light becomes maximal or so that the blue backscattering becomes minimal. For this purpose, the temperature of the laser 3 is adjusted using heating element 13 in the illustrated embodiment, in order to modify the wavelength to the value of maximum absorption, typically 465 nm±2 nm.

More generally, without being limited to the specific illustrated example, it is contemplated according to one embodiment of the invention that the means 9 comprise a heating element 13 for regulating the temperature of the laser 3.

Figure 4:
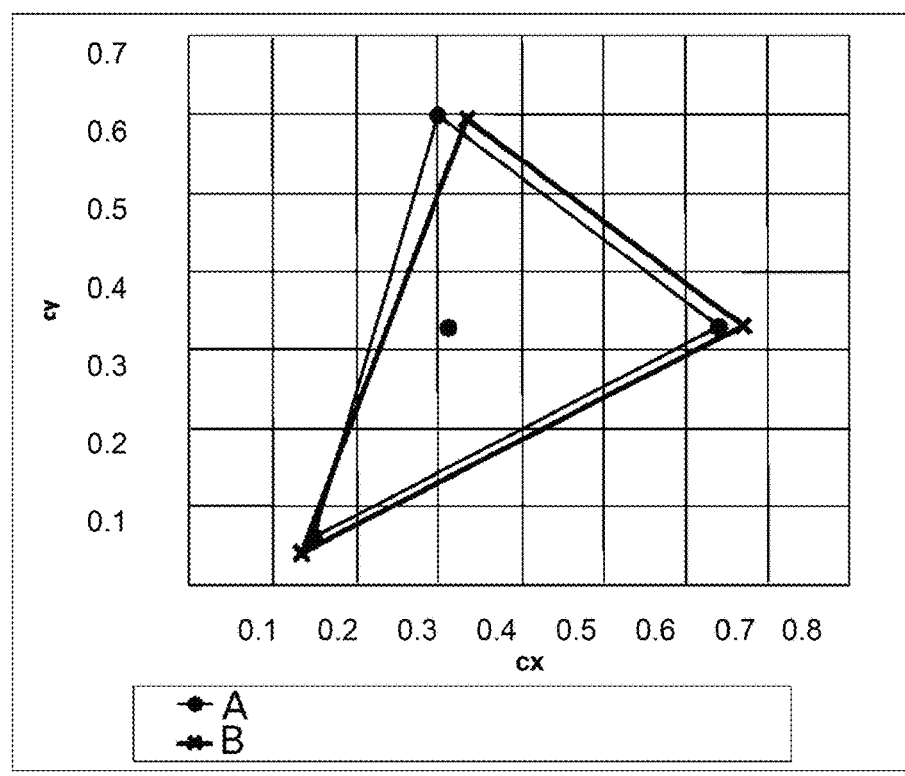
FIG. 4 shows a color space spanned by a red emitting converter.

The $Eu^{3+}$-doped red emitting converter element 7 which is typically excited at 465 nm can advantageously be used for digital projection, since the color coordinates of its emission are very well suited to define the red vertex of a color space for projection. This is exemplified in FIG. 4 for a fictitious projector, whose RGB color channels are provided by the $Eu^{3+}$-doped phosphor, a LuAG phosphor, and a laser at 465 nm (FIG. 4, color range "B"). In particular the red and blue vertices nearly ideally include the widely used Rec 709 standard color space of digital projection (FIG. 4, color range "A"). The green vertex may be adjusted to the standard's color space specifications using suitable color filters. The excitation at 465 nm is also advantageous in this respect, since it allows to encompass the standard color space with a comparatively high lumen equivalent of the blue light of 50 lm/W. In comparison, a 450 nm laser only has a lumen equivalent of blue light of 25 lm/W.

In the arrangements illustrated by examples of FIGS. 2 and 3, the converted light is emitted from the same surface of the converter element 7 which is irradiated by the laser light. Thus, these are remission light sources. Generally, an embodiment of the light source is preferred which comprises a luminescent inorganic converter element that is operated in remission. Accordingly, in a further embodiment of the invention, the light source is configured to emit light that is emitted by the luminescent inorganic converter element in remission. However, a transmission configuration is also possible.

Various red emitting ceramic converter materials have been experimentally investigated. The following table provides an overview of the composition of the examined materials.

| Sample # | Material (main phase) | Detected secondary phase | Components prior to sintering | Sinter density ca. |
|---|---|---|---|---|
| 202003 | $(Y_{0.5}EU_{0.5})_2Mo_3O_{12}$ | $(Y_{0.5}EU_{0.5})_2Mo_4O_{15}$ | $Y_2O_3$, $Eu_2O_3$, $MoO_3$ | 93% |
| 202007 | $(Y_{0.5}EU_{0.5})_2Mo_3O_{12}$ | $(Y_{0.5}EU_{0.5})_2Mo_4O_{15}$ | $Y_2O_3$, $Eu_2O_3$, $MoO_3$ | 95% |
| 202009 | $(Y_{0.5}EU_{0.5})_2Mo_3O_{12}$ | $(Y_{0.5}EU_{0.5})_2Mo_4O_{15}$ | $Y_2O_3$, $Eu_2O_3$, $MoO_3$ | 94% |
| 202201 | $(Y_{0.5}EU_{0.5})_2Mo_4O_{15}$ | $MoO_3$ | $Y_2O_3$, $Eu_2O_3$, $MoO_3$ | 95% |

In particular, the ceramic materials preferably used for the converter contain $Eu^{3+}$ as an active element, and the host lattice of the $Eu^{3+}$ is of the scheelite type. Without being limited to the examples in the table, the Eu containing compounds which are suitable for the converter may more generally comprise molybdates, vanadates, tungstates, or tantalates, preferably in ceramic form, and preferably these compounds additionally containing at least one of the following elements: lanthanum, terbium, gadolinium, yttrium, and lutetium. Here, according to one refinement of this embodiment, Eu replaces at least one of the mentioned elements in a percentage between 10% and 100%, preferably between 50% and 100%, more preferably between 70% and 95%.

According to yet another embodiment, the luminescent $Eu^{3+}$ containing material may be a molybdate, vanadate, tungstate or tantalate, while this compound additionally contains at least one of the following elements: lithium, sodium, potassium, magnesium, calcium, or strontium.

The converter may be made of a single-phase ceramic. If the converter includes more than one phase, these phases may comprise the compounds mentioned above.

The converter in particular does not contain any residues of $MoO_3$, $VO_3$, $WO_3$, or $TaO_3$.

From among the above-mentioned samples, sample #202009 listed in the table above was used to experimentally verify the approach of the invention. The measurements were performed on a converter of 200 µm thickness made from the sample. The converter was placed on a highly reflective mirror plate. The blue light of a 465 nm laser was irradiated onto the converter at an angle of 30°. The emitted light intensity was resolved spectrally. The spectrometer used was a CAS 140+ with a measuring head coupled via a glass fiber bundle.

The color coordinates shown in the table below were determined from the measured spectrum for the specified spectral ranges. These measurement results confirm that a material with purple color coordinates can be achieved.

|  | cx | cy |
|---|---|---|
| Blue | 0.135 | 0.041 |
| Blue and red | 0.287 | 0.123 |
| Red (λ > 600 nm) | 0.684 | 0.316 |

Figure 5:
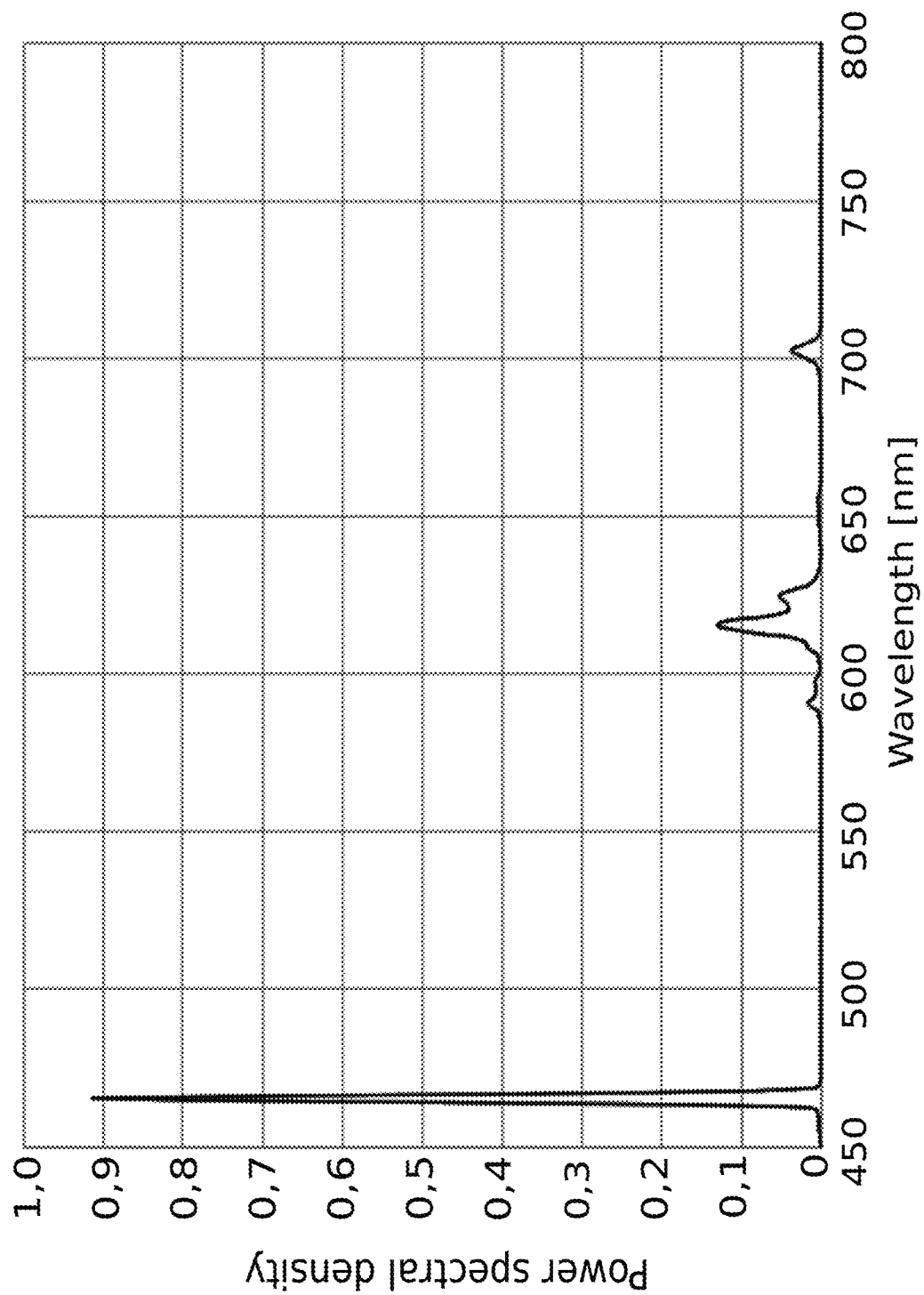
FIG. 5 shows the emitted spectrum of a sample excited by a blue laser beam.

A spectrum emitted by such a sample is shown in FIG. 5. This spectrum also includes the scattered primary light with a wavelength of approximately 465 nm.

The lumen equivalent of the red spectrum is 292 lm/W. This means that a radiant flux of 1 W of the red emission corresponds to a photometric flux of 292 lm/W. The conversion efficiency, i.e. the ratio of emitted red light to the input power was estimated to be 33 lumen/W.

Figure 6:
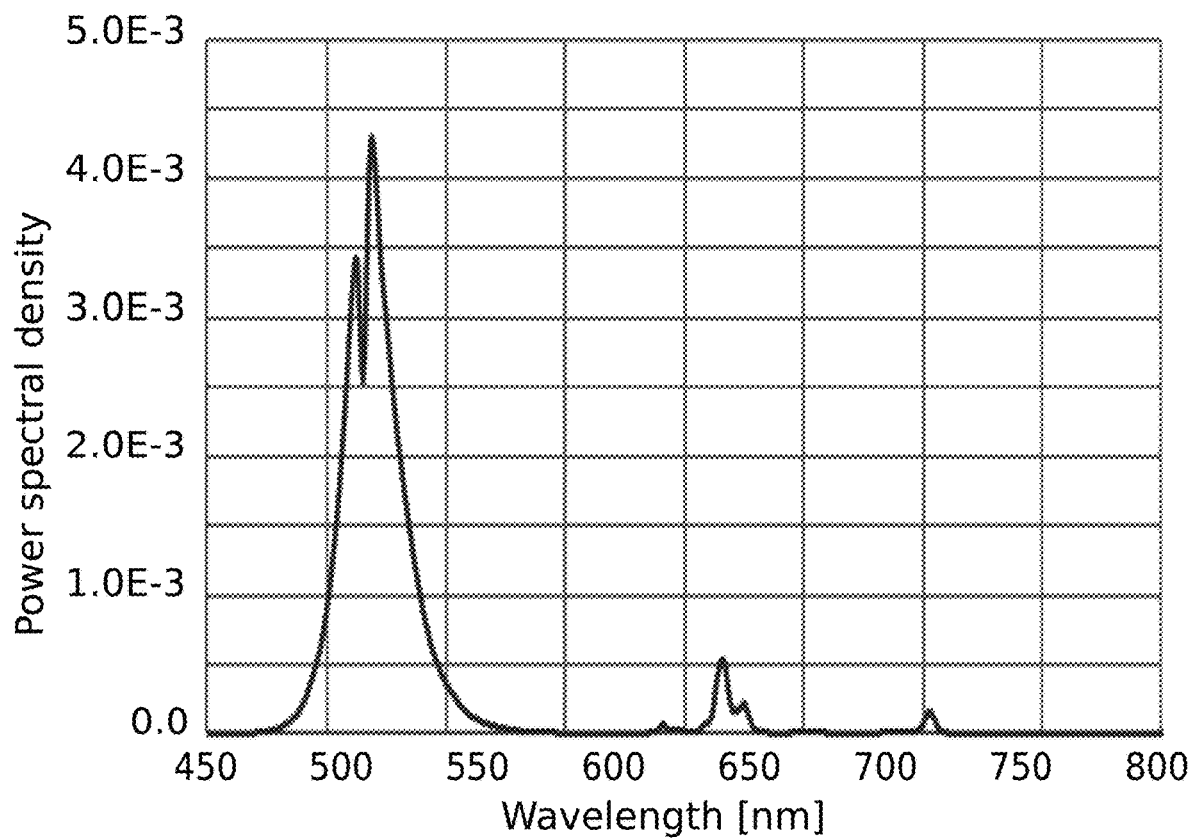
FIG. 6 shows the emitted spectrum of a sample excited by a blue light-emitting diode.

FIG. 6 shows a power spectral density versus wavelength graph for sample OC-202007 listed in the table above. In this case, the sample was excited by a blue LED. As in the example shown in FIG. 1, the narrow-band absorption of the $Eu^{3+}$ can be seen as a sharp local minimum in the blue spectral range. This measurement confirmed the negligible temperature dependence of the absorption wavelength. For this purpose, the converter was placed on a hot plate and irradiated with the light from the blue LED. When heated to 170° C., the absorption wavelength of the converter did not change measurably.

Thus, if the wavelength of the employed laser diodes is not stabilized, the wavelength can be adjusted solely through the temperature of the laser. The temperature of the converter need not be taken into account. For a commercially available 465 nm laser diode, a shift of 0.052 nm/K was measured.

Generally, therefore, a digital projector is provided according to one embodiment of the invention, which comprises a light source 1 according to the invention. According to another embodiment, as in the example explained above, the converter 5 of light source 1 may advantageously furthermore comprise an element which emits green light through photoluminescence when irradiated by the laser 3, in addition to the luminescent inorganic converter element 7 comprising the $Eu^{3+}$-doped ceramic. As mentioned before, LuAG, i.e. a lutetium aluminum garnet, is particularly suitable as the luminescent material of such an element. The green emitting element may in particular also be provided in the form of a ceramic material. However, green light, in particular for the projector mentioned, may also be generated in other ways than by photoluminescence. More generally, it is therefore contemplated according to one embodiment of the invention that the light source 1 comprises a green light emitting emitter, preferably in the form of the element as mentioned which emits green light through photoluminescence when irradiated by the laser 3.

In principle, a converter can be operated in transmission or in reflection. In a reflection configuration, it may generally be advantageous to design the phosphor ceramic so as to be highly scattering in order to minimize a lateral enlargement of the emission spot for a given blue excitation spot. However, particularly in the case of materials with limited absorption of the blue light, this is typically also associated with strong backscattering of the blue light and thus with strong diffuse blue reflection. If the $Eu^{3+}$-doped phosphor ceramic is design to be highly scattering, e.g. by introducing pores or other scattering centers, the combination of the red emission color coordinates with the blue remission can give purple emission color coordinates for the overall assembly. More generally, according to one embodiment of the invention, a converter assembly 5 is accordingly provided which comprises a luminescent inorganic converter element 7 comprising ceramic that is $Eu^{3+}$-doped such that the converter 5 emits photoluminescent light in the red spectral range when exposed to the laser light, and wherein the luminescent inorganic converter element 7 is designed to be light-scattering so that scattered blue laser light combines with the red photoluminescent light to give emitted purple-colored light.

Figure 7:
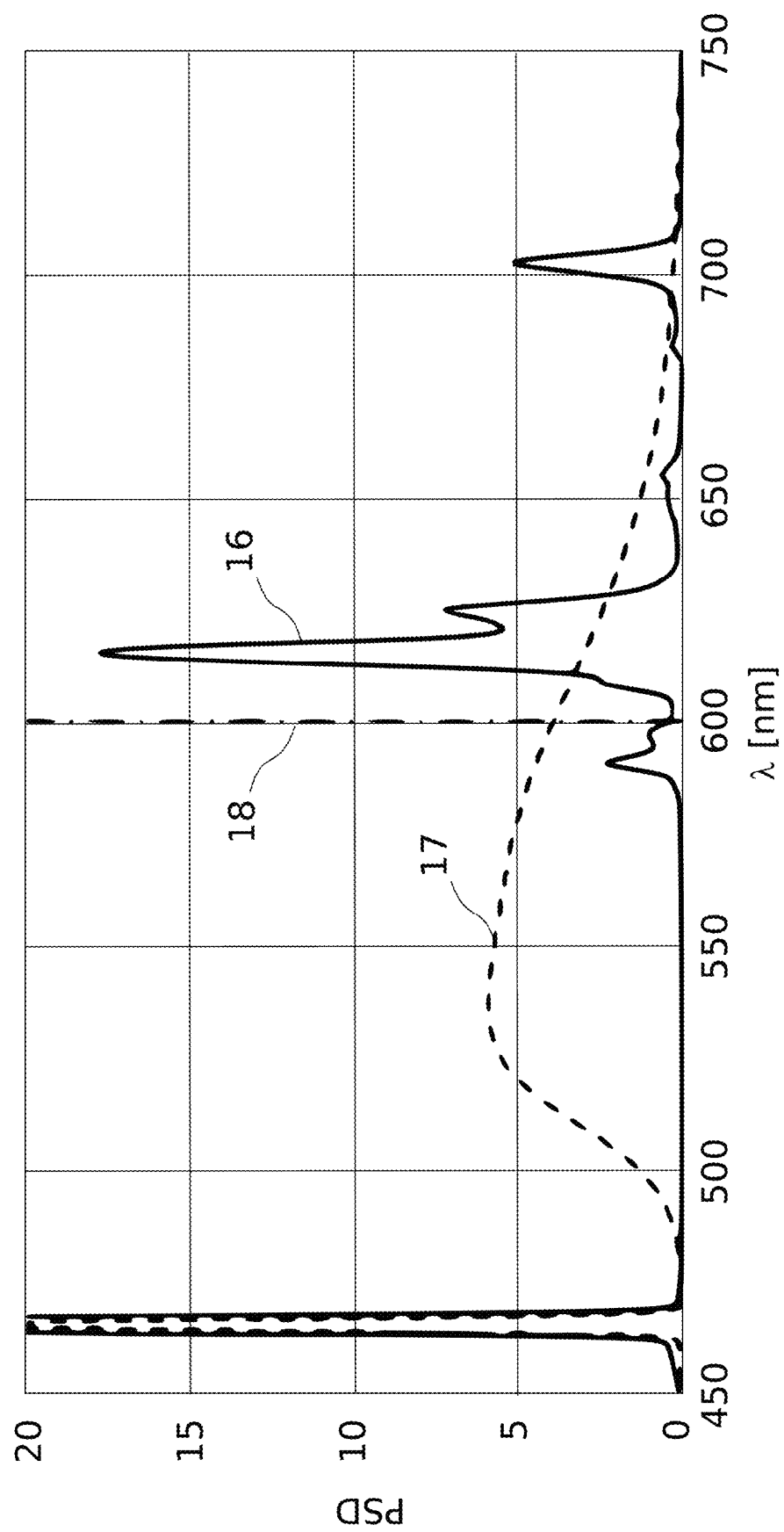
FIG. 7 shows the emission spectrum of a sample excited by a blue laser diode in comparison to a cerium-doped YAG ceramic excited by the same blue laser diode.

FIG. 7 shows spectra of power spectral density (PSD) as a function of wavelength. The spectrum 16 of a purple-colored $Eu^{3+}$ photoluminescence converter is shown in comparison with the white-yellow emission spectrum 17 of a cerium-doped YAG phosphor in FIG. 7. In many projectors, the red fraction of this phosphor is used for the red channel of a projector. The part of the spectrum used for this purpose is illustrated by an idealized edge filter 18 with a cut-off wavelength of 600 nm. Both spectra were captured at the same excitation light power. With the integration of the spectrum weighted with the eye sensitivity curve, a parameter is calculated for both spectra, which is proportional to the photometric luminous flux, measured in lumen (lm). The proportionality constant is determined from the known efficacy of the yellow reference sample of 317 lm/W. This allows to calculate the efficacy for the red emitting sample as well. The efficacy of a converter is the photometric luminous flux emitted by the sample, normalized to the incident light power and measured in lumen per watt (lm/W). The efficacy can be calculated either for the red (600 nm-780 nm), the green (475 nm-600 nm), or the entire "yellow" (475 nm-780 nm) spectral range, by adjusting the integration limits. Since the efficiency of converter materials typically shows a dependence on sample temperature and power or spot size of the excitation light, the red efficacy in the context of the present document is defined for a measurement with a light spot size of approximately 1 mm and a power of 1-10 mW at room temperature. For the example shown in FIG. 7, the following efficacy values were determined at an excitation power of 3.5 mW of the 465 nm laser:

|  | Yellow efficacy [lm/W] | Green efficacy [lm/W] | Red efficacy [lm/W] |
|---|---|---|---|
| Wavelength range | 475 nm-780 nm | 475 nm-600 nm | 600 nm-780 nm |
| Red emitter OC-202009c | 57.2 | 8.5 | 48.7 |
| Reference sample Ce:YAG | 317.0 | 282.9 | 34.1 |

Thus, with 48.7 lm/W the red sample exhibits a red efficacy that is significantly better than that of a typical cerium-doped YAG converter which has a red efficacy of 34.1 lm/W. More generally, without being limited to particular exemplary embodiments described herein, it is therefore contemplated according to a further embodiment of the invention that the red efficacy of the converter material is greater than 35 lm/W.

Emission of purple light may also arise if the phosphor is excited over an excessively broad band or in a manner not matched in terms of the spectrum. The reason for this may be the use of a large number of blue excitation lasers in order to achieve the laser output power required in high-performance projectors. These lasers usually do not emit exactly identically in terms of their spectrum and, overall, define a rather broadband excitation light source. However, this may even be advantageous, since it allows to dispense with the laser wavelength stabilization described above, but then causes an admixture of blue to the useful light and thus results in a purple light source. Irrespective of whether the lasers are all precisely matched to the $Eu^{3+}$ absorption, a light source 1 may be provided comprising a plurality of lasers, in particular such that these lasers simultaneously irradiate the same spot of the converter.

Figure 8:
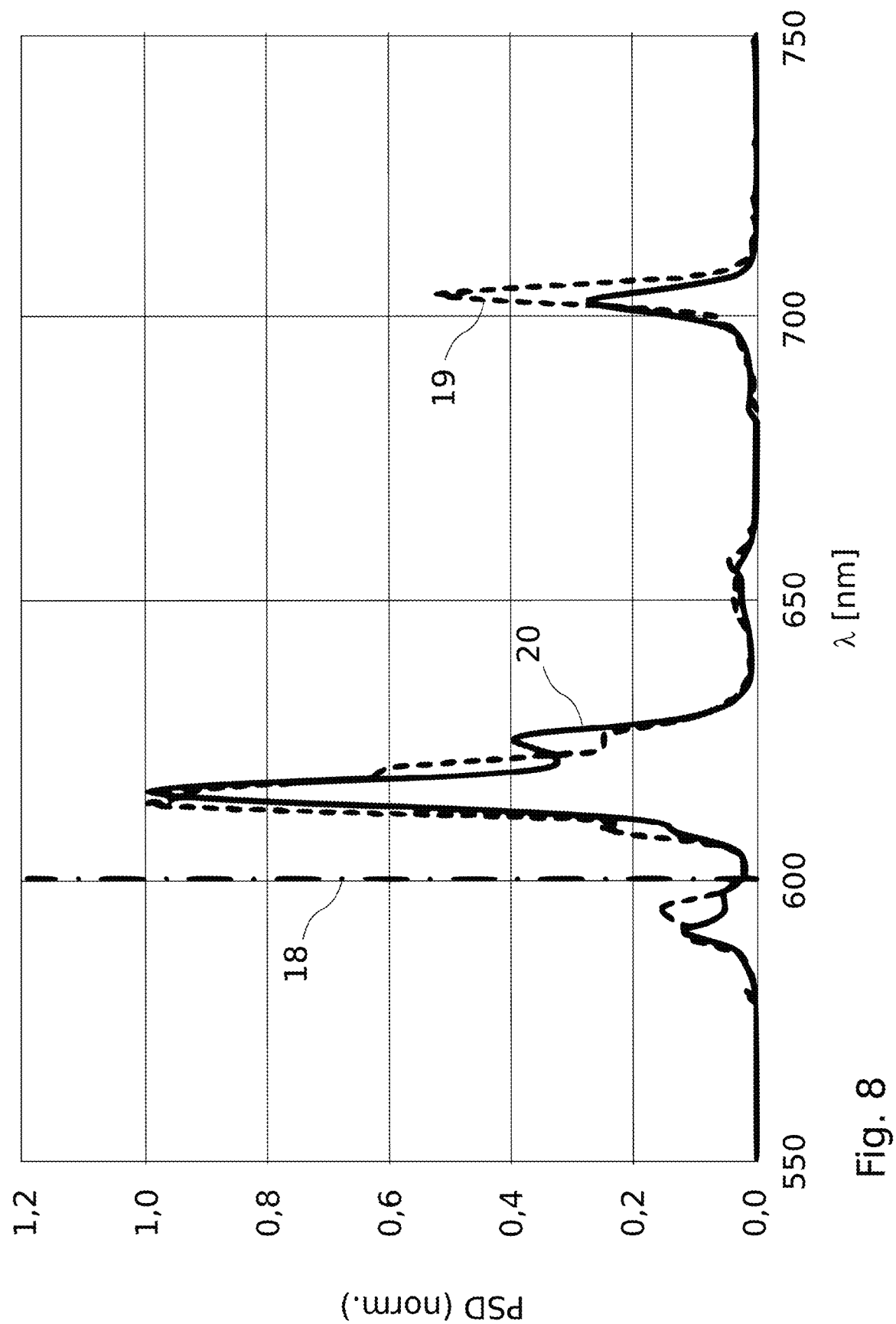
FIG. 8 shows a comparison of emission spectra of two differently $Eu^{3+}$-doped ceramics which were excited by the same blue laser diode.

FIG. 8 shows emission spectra 19, 20 of converters that include different host materials. The power spectral densities illustrated in FIG. 8 show that the $Eu^{3+}$ emission may vary depending on the host material. In order to be able to compare the spectra, the power spectral densities were normalized to the maxima of the spectra.

For the two ceramics, the following color coordinates lying within the red color range are resulting:

|  | cx | cy |
|---|---|---|
| Curve 19 | 0.6823 | 0.3176 |
| Curve 20 | 0.6843 | 0.3156 |

In particular the weighting of the spectral components may vary, which may have an impact on the color coordinates of the emission, without however restricting the suitability of the material for use in projection. Materials are preferred in which the emission at 700 nm is not very pronounced, since the eye's sensitivity for light of this wavelength is only very low and thus it hardly contributes to the perceived brightness of the light.

Figure 9:
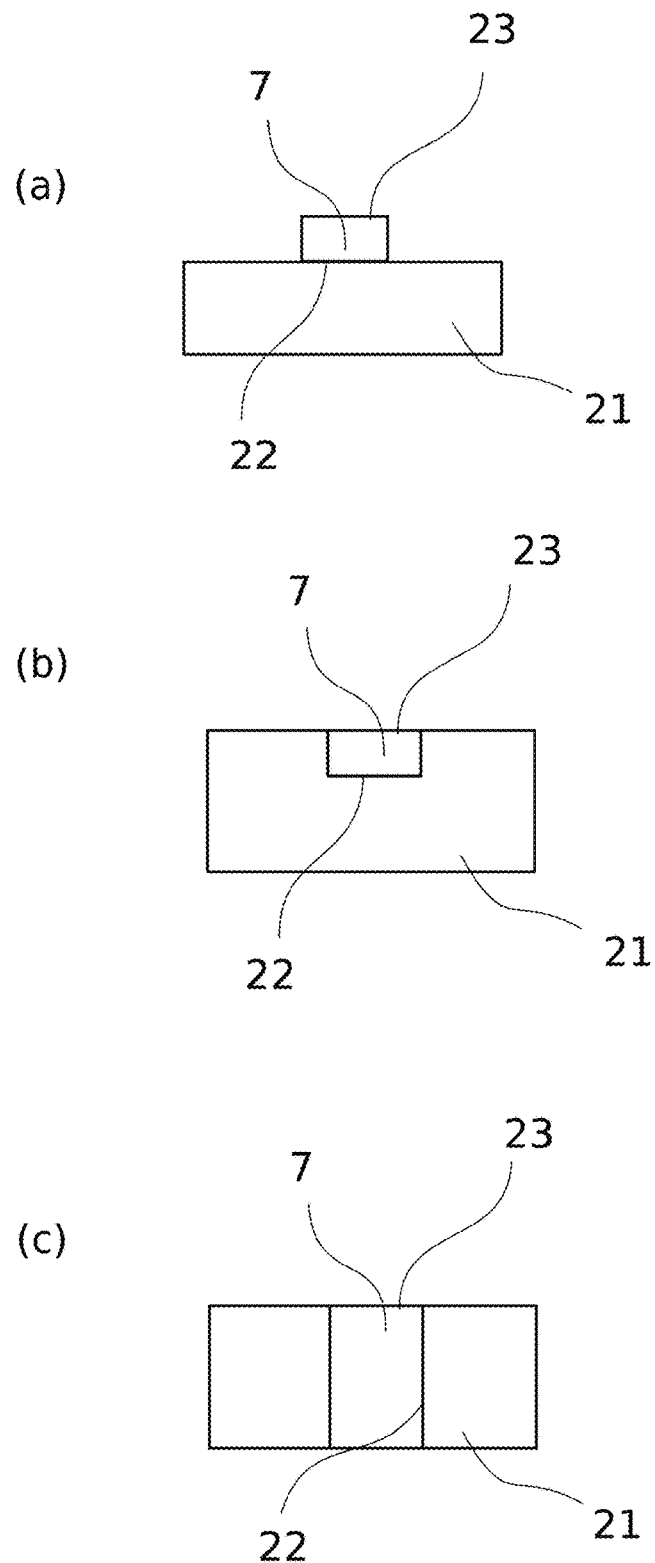
FIG. 9 shows different configurations of static converter assemblies with heat spreader, anti-reflective coating and reflectors for enhancing the useful light output.

FIG. 9 shows three different configurations (a), (b), and (c) of static converter assemblies each comprising a heat spreader 21, an anti-reflective coating 23, and a reflector 22 for increasing the output of useful light.

In the embodiment according to panel (a), the luminescent inorganic converter element 7 is applied to a heat spreader 21. A reflector 22 may be applied to the heat spreader below the converter element 7, for example in the form of a dielectric or metallic reflection layer. The outwardly facing surface of the luminescent converter element 7 may be provided with an anti-reflective layer 23 in order to improve the emission of the light. The embodiments according to panels (b) and (c) also comprise a reflector 22 arranged between the heat spreader and the luminescent converter element 7. Here, the luminescent converter element 7 is arranged so as to be integrated in the heat spreader 21. For example, the heat spreader 22 may have an appropriate recess for this purpose. In the embodiment according to panel (c), the luminescent converter element 7 is integrated in a through-opening of the heat spreader 21, so that photoluminescent light can be emitted to both sides of the heat spreader and from both mouths of the through opening. In this embodiment, the inner surface of the through-opening may be provided with a reflector 22. In the case of transmissive operation, a dichroic reflector may be applied on the side of the excitation light, which transmits the blue excitation light and reflects the red emitted light.

The purple emission as suggested according to the invention can be used for the projection. The red and blue color channels are generated from the purple phosphor by color wheel filtering.

Figure 10:
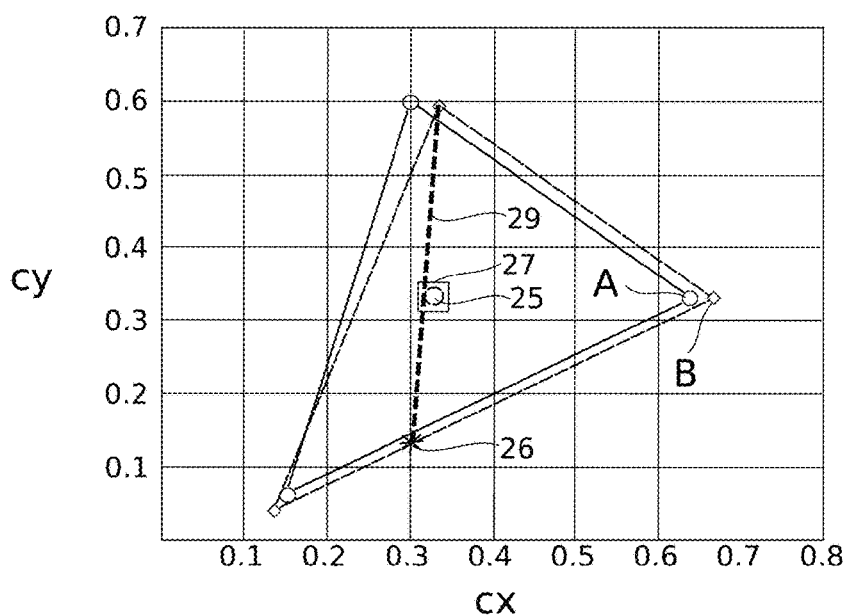
FIG. 10 shows a color space spanned by purple light.

If emitted light that includes blue and red components, that is to say purple light, is used to produce different colors, in particular for a projector, it is furthermore generally favorable if the purple phosphor or the purple emission is designed such that the color coordinates on the purple line between the blue and red color coordinates are such that a connecting line to the green vertex of the color space passes through the white point. This embodiment is illustrated by FIG. 10. Similarly to FIG. 4, this graph shows the Rec 709 color space which is delimited by curve "A". Curve "B" again delimits the color range that can be spanned by a $Eu^{3+}$-doped phosphor, a LuAG phosphor, and a laser at 465 nm. The white point 25 with color coordinates cx=cy=0.33 is also shown. In a converter assembly 5 such as a color wheel for a 1-chip projector, the blue channel then does not have to be defined by an opening in the phosphor wheel but is generated from the purple phosphor by color wheel filtering. For this purpose, the purple phosphor and/or the excitation by the blue laser light are advantageously designed such that a connecting line from the color coordinates on the purple line between the blue and red color coordinates to the green vertex of the color space preferably passes through the white point 25.

Regardless of the configuration of the converter, that is also regardless of whether the converter comprises a color wheel or not, a light source is provided according to one embodiment of the invention, which comprises, in addition to the luminescent inorganic $Eu^{3+}$ ions containing converter element 7, a further photoluminescent emitter for emitting green photoluminescent light, and wherein the laser 3 and the luminescent inorganic converter element 7 are matched to one another such that the ceramic element emits purple light including red photoluminescent light and scattered light from the laser 3, and wherein a ratio of the intensities of the red photoluminescent light and of the light from the laser 3 in the emitted light is such that the color coordinates 26 of the emitted purple light lie on a line 29 which starting from the color coordinates of the photoluminescent light of the further photoluminescent emitter passes through an area 27 around the white point at color coordinates cx=cy=0.33, which area 27 is defined by color coordinate ranges of 0.31≤cx≤0.35 and 0.31≤cy≤0.35. The area 27 around white point 25 is shown in FIG. 10. Accordingly, to achieve still very good color reproduction, it is not necessary for the line 29 to pass exactly through the white point 25. In the illustrated example, line 29 runs slightly past white point 25, but still passes through area 27. The purple light can then be divided into blue and red components, by spectral filtering, so as to then span the entire color space.

In projector applications, the blue light is typically directed onto the converter material through a dichroic beam splitter to separate the blue from the yellow light path.

As a result, the blue light cannot be mixed with the yellow light in such an optical configuration. This is at least the case for light that has the same polarization as the incident laser light. But even when using a polarization-dependent beam splitter, not more than 50% of the incident light can be reused.

For this reason, a tilted beam configuration may be employed in white light applications for mixing yellow and blue light, which allows to laterally irradiate the excitation light from the laser and to collect the generated light including its blue component from the vertical direction. A problem with this approach is that the coupling efficiency is limited since the space required for emission of blue light cannot be used to combine the light beams. For example, if a lens 33 is used to collimate the light, the numerical aperture (NA) of the lens 33 is limited. An exemplary arrangement for this is shown in panel (a) of FIG. 11. Usually, a lens 33 with high NA as shown in panel (b) is used for collimation. To solve this problem, the lateral side of the lens 33 may be designed specifically so as to direct the incident laser beam 30 through the converging lens 33 onto the converter 5 (FIG. 11, embodiment (c)). Here, the large differential between the etendue of the laser light 30 and of the emitted light 50 is advantageously exploited to sophistically direct the incident laser beam 30 onto the converter 5. For a purple light source, it is crucial to proceed in this way since the material of the converter 5 can only be used efficiently if the backscattered blue light can also be exploited.

Figure 11:
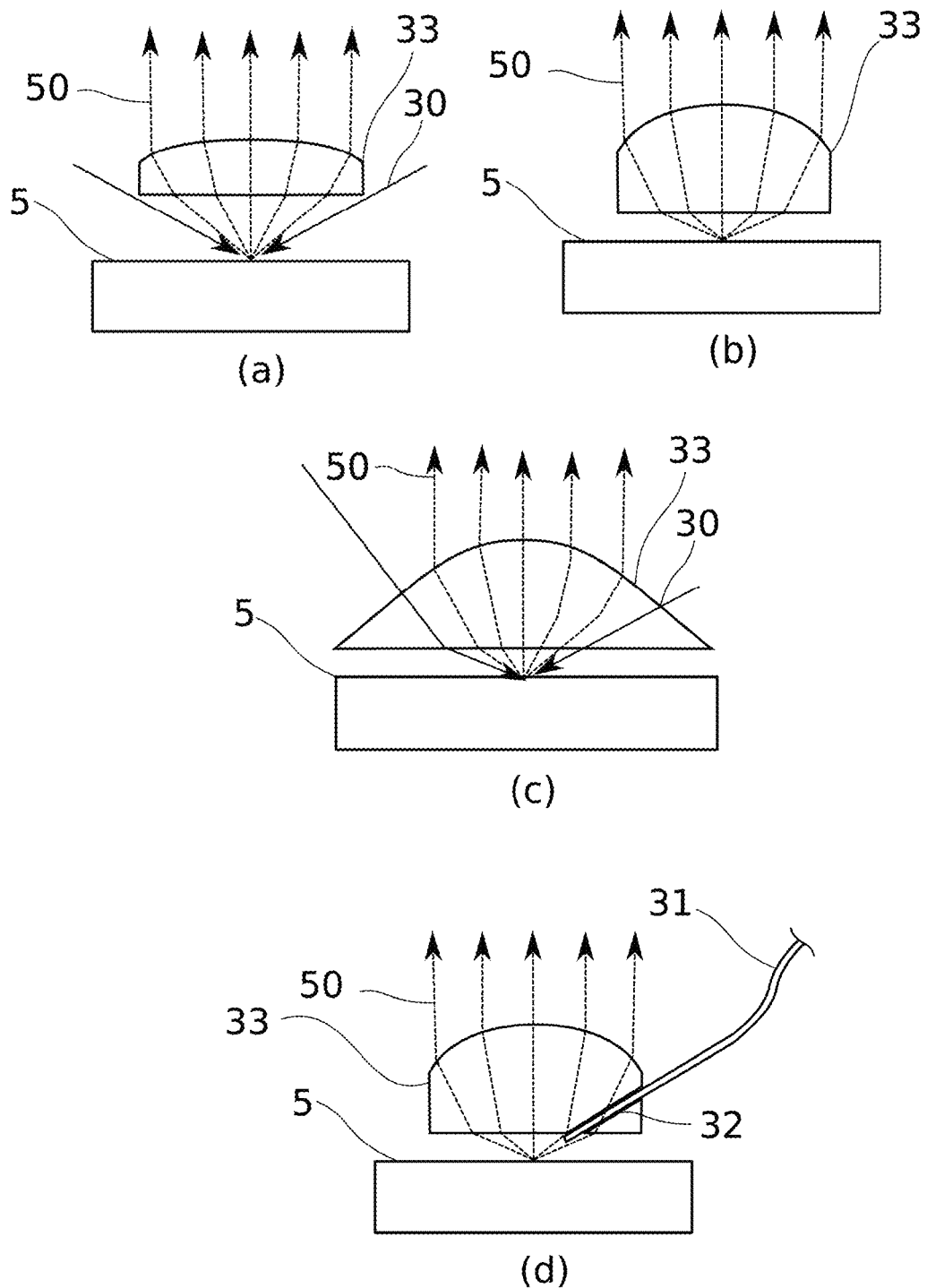
FIG. 11 shows different configurations of a converter assembly excited from the front side when using a collimating lens.

In particular if the blue laser beam 30 is directed onto the converter via one or more optical fibers 31, one or more channels or passages 32 for the fibers 31 may be provided in the respective collimation lens 33 in order to approach a fiber 31 as close as possible to the surface of the converter 5. Panel (d) of FIG. 11 shows such a configuration in which an optical fiber 31 is introduced into a passage 32 of the lens 33 for feeding the laser light. The light sources according to panels (c) and (d) represent exemplary embodiments of the invention in which the light source comprises a lens 33 for collimating the light emitted by the converter 5, with an arrangement such that the laser light is incident on the converter after passing through the lens or the laser light is directed through the lens 33 and onto the converter 5. For this purpose, the lens 33 may have a special shape, as in the example of panel (c).

The converter assemblies shown in FIGS. 9 and 11 and known as "static" are of particular interest for the photoluminescence converter of the invention, since the decay time of the converter is comparatively long, so that the light-emitting area is not enlarged in statically operated configurations. As described above, the converter can be applied to a heat spreader and may optionally be operated in a pulsed mode in order to generate light—and hence waste heat—only when the red or optionally the blue color channel is required.

Figure 12:
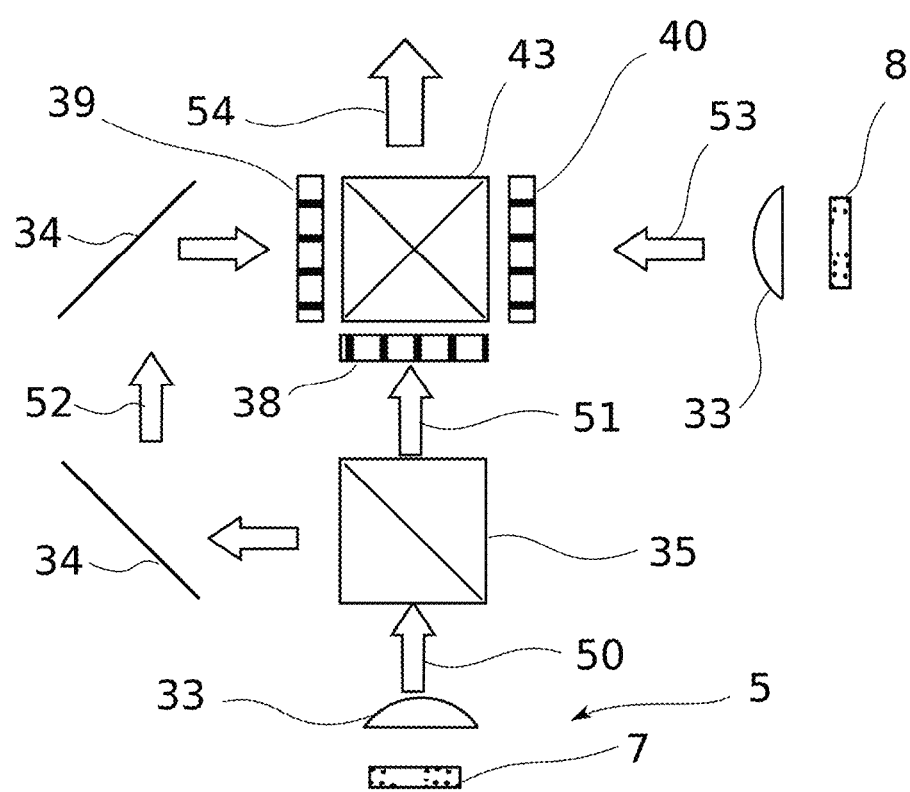
FIG. 12 schematically shows the configuration of a 3-chip projector.

A light source 1 according to the invention may also be employed with particular advantage in a 3-chip projector. In principle, it is again possible here for the red and blue channels to be fed from the purple phosphor, i.e. the luminescent inorganic converter element 7. However, since the color channels are not superimposed sequentially in time in this case, but spatially, by a dichroic cross prism known as X-cube, the entire luminous flux emitted can be used in the projector, in principle without any filter loss. Such a projector is shown in FIG. 12. The principle of this projector is based on the fact that the luminescent inorganic converter element 7 and the laser 3 are adapted such that the converter element 7 emits purple light including a blue component from scattered laser radiation and a red component from photoluminescence excited by the laser beam, and the blue and red components are spatially split into a blue and a red light beam and the two light beams are fed to two different chips of the projector to generate colored sub-images.

As shown in FIG. 12, the purple light 50 emitted by the luminescent inorganic converter element 77 can be collimated by a lens 33. The light 50 is directed onto a dichroic beam splitter 35 which splits the blue and red components into two light beams 51, 52. In the example shown, the red sub-beam 51 is transmitted straight through the beam splitter 35 and onto a first chip 38, while the blue sub-beam 52 is reflected out laterally. Via a mirror 34, the blue sub-beam 52 is directed onto a second chip 39. Furthermore, a green light emitter is provided. Again, the further luminescent inorganic converter element 8 as mentioned above can be used for this purpose, for example in the form of a LuAG ceramic element. The green sub-beam 53 is directed onto a third chip 40. More generally, without being limited to the illustrated example, the chips 38, 39, 40 for generating colored sub-images may be in the form of LCD chips. The three light beams transmitted through the chips 38, 39, 40 are then combined in a dichroic cross prism 43 to form an image beam 54 which carries the image information and can then be projected.

The invention may also be used generally for lighting purposes. Particularly considered is the use for signaling lights such as for airport lighting, maritime signaling lights, warning lights on wind turbines and radio masts, in the field of special lighting such as stage lighting, effect lighting, architectural lighting.

In order to be able to produce white light for general lighting purposes, the purple light may be combined with green light. The combining with a suitably adapted light source 1 may in particular be made in a way so that color coordinates in the vicinity of the white point are achieved, as can be seen from FIG. 10. Accordingly, for generating white light, the laser and the luminescent inorganic converter element 7 are preferably adapted so that the color coordinates of the emitted light lie on the line 29 starting from the color coordinates of the green light emitter. The green emitter may be a green photoluminescent emitter, as in the example described above. In particular, as shown, the color coordinates 26 are advantageously given by the intersection of line 29 with the purple line of the color space. Depending on the desired effect, the color coordinates of the light source may as well lie close to the white point 25, for example in order to achieve warmer or colder color tones.

More generally, it is therefore suggested according to a further embodiment that the light source comprises a green emitter and generates white light by combining it with the blue light from the laser and the red photoluminescent light emitted by the luminescent inorganic converter element 7. Preferably, again, a ratio of the intensities of the red photoluminescent light and the light from the laser 3 in the emitted light is such that the color coordinates 26 of the emitted purple light lie on the line 29 emanating from the color coordinates of the photoluminescent light of the further photoluminescent emitter and passing through an area 27 within a range of color coordinate of $0.31 \leq cx \leq 0.35$ and $0.31 \leq cy \leq 0.35$.

The use of the purple light produced by combining blue remission and red emission as described herein does not imply that the converter excited by laser light of 465 nm can only be used in this way. The red efficacy of more than 34 lm/W as already proven shows that a light source comprising a converter assembly which includes such a red emitting inorganic converter element is particularly advantageous also when not using the blue excitation light, depending on the application.

LIST OF REFERENCE NUMERALS

1 Light source
2 Projector
3 Laser
5 Converter assembly
7,8 Converter element
9 Means for stabilizing laser wavelength
11 Loop control circuit
13 Heating element
15 Light detector
16, 17, 19, 20 Emission spectrum
18 Edge filter
21 Heat spreader
22 Reflector
23 Anti-reflective coating
25 White point
26 Color coordinates of purple light
27 Area around 25
29 Line through 27
30 Laser beam
31 Optical fiber
32 Passage through 33
33 Lens
34 Mirror
35 Dichroic beam splitter
38, 39, 40 Chip
43 Dichroic cross prism
50 Light emitted by converter 5
51 Red sub-beam
52 Blue sub-beam
53 Green sub-beam
54 Image beam
91 Diffraction grating

What is claimed is:

1. A light source, comprising:
   a laser operable to emit laser light at a wavelength in a range from 460 nanometers to 470 nanometers;
   a laser light wavelength stabilizer that comprises an active loop control with a loop control circuit that stabilizes the laser at an absorption wavelength of $Eu^{3+}$ ions; and
   a converter assembly arranged to convert the laser light to photoluminescent light having a longer wavelength than the laser light,
   wherein the converter assembly comprises a converter element doped with $Eu^{3+}$ such that under irradiation of the laser light the converter assembly emits photoluminescent light in a red spectral range.

2. The light source of claim 1, wherein the converter element has a red efficacy greater than 35 lm/W.

3. The light source of claim 1, wherein the converter element is made of a material selected from a group consisting of glass, sintered glass powder, phosphor powder embedded in glass, glass ceramic, and ceramic.

4. The light source of claim 1, wherein the converter assembly operates in remission.

5. The light source of claim 1, wherein the converter element comprises a material selected from a group consisting of a host scheelite lattice of $Eu^{3+}$ ions, tungstate, $Li_3Ba_2La_3(MoO_4)$—$Eu^{3+}$, $(Y_{1-x}Eu_x)^2Mo_3O_{12}$, $(Y_{1-x}Eu_x)_2Mo_4O_{15}$, $Li_3Ba_2(La_{1-x}Eu_x)_3(MoO_4)_8$, $K(Y_{1-x}Eu_x)(WO_4)_2$, $Li(Y_{1-x}Eu_x)(WO_4)_2$, $Na(Y_{1-x}Eu_x)(WO_4)_2$, $MgY_{2-x}Eu_x(WO_4)_4$, $CaY_{2-x}Eu_x(WO_4)_4$, $Ca_{1-2x}Eu_xLi_xWO_4$, molybdate, vanadate, tungstate, tantalate, lanthanum, terbium, gadolinium, yttrium, and lutetium,
   wherein Eu replaces at least one of element in the material of the converter element in a percentage between 10% and 100%,
   wherein the material of the converter element further comprises an element selected from a group consisting of molybdate, vanadate, tungstate, tantalate, lithium, sodium, potassium, magnesium, calcium, and strontium.

6. The light source of claim 1, wherein the converter assembly comprises a heat spreader bonded to the converter element.

7. The light source of claim 1, wherein the converter element has a useful-light area with an anti-reflective layer.

8. The light source of claim 1, wherein the converter element has a non-useful-light area that is at least partially mirrored or is surrounded by a diffusely or specularly reflecting reflector.

9. The light source of claim 8, wherein the laser emits laser light at a wavelength in a range of 465 nm±2 nm.

10. The light source of claim 1, wherein the laser light wavelength stabilizer comprises a heating element that regulates a temperature of the laser.

11. The light source of claim 1, further comprising a green emitting light emitting element.

12. The light source of claim 11, wherein the green emitting light emitting element emits green light through photoluminescence when irradiated by the laser.

13. The light source of claim 1, wherein the converter element is light-scattering so that scattered laser light combines with the photoluminescent light to emit purple colored light.

14. The light source of claim 1, further comprising:
   a photoluminescent emitter for emitting green photoluminescent light, wherein the laser and the converter element are matched to one another such that the converter element emits purple light which includes red photoluminescent light and scattered light from the laser; and
   a ratio of intensities of the red photoluminescent light and of the light from the laser is such that color coordinates of the purple colored light lie on a line emanating from the color coordinates of the photoluminescent light of the photoluminescent emitter and passing through an area around the white point at color coordinates $cx=cy=0.33$, the area being defined by color coordinate ranges of $0.31 \leq cx \leq 0.35$ and $0.31 \leq cy \leq 0.35$.

15. The light source of claim 1, further comprising a green emitter that, when combined with blue light from the laser and the red photoluminescent light from the converter element, generate white light.

16. The light source of claim 1, further comprising a lens for collimating light emitted by the converter assembly, wherein the laser light is directed to the converter assembly through the lens.

17. The light source of claim 16, wherein the lens has a passage into which an optical fiber is introduced to feed the laser light.

18. A digital projector comprising the light source of claim 1.

19. The digital projector of claim 18, wherein the converter element and the laser are configured so that the converter element emits purple light including a blue component from scattered laser radiation and a red component from photoluminescence excited by the laser, wherein the blue and red components are spatially split into blue and red light beams and each of the light beams is fed to a respective different one of two chips to generate colored sub-images.

* * * * *